United States Patent Office 3,450,527
Patented June 17, 1969

3,450,527
WELDING ALLOY
Daniel P. Tanzman, Far Rockaway, N.Y., assignor to Eutectic Welding Alloys Corporation, Flushing, N.Y., a corporation of New York
No Drawing. Filed Dec. 9, 1966, Ser. No. 600,396
Int. Cl. C22c 19/00; B23k 35/22
U.S. Cl. 75—170
10 Claims

ABSTRACT OF THE DISCLOSURE

A nickel base alloy having in weight percent from .5 to 1.9 percent boron, 1 to 4.5 percent silicon and 23 to 35 percent copper. This alloy has exceptional corrosion resistance and improved welding characteristics.

---

This invention relates to a metallic alloy and more particularly to a nickel copper type welding alloy.

Heretofore in the art of welding the self-fluxing alloys comprised primarily of the nickel base boron modified alloys such as the nickel boron silicon and nickel boron chrome silicon alloys. These alloys have relatively higher melting characteristics which restrict their application on the lower melting base metals, such as bronzes and copper nickel types. The lower melting nickel boron silicon and nickel boron chrome silicon alloys that have been produced have been found to have much higher hardness characteristics resulting in their being non-machinable. Further, these nickel boron silicon and nickel boron chrome silicon alloys although they possess some corrosion resistance for a limited range of specific applications, they have been found to be non-acceptable for a wide range of corrosion sensitive applications. There has been a need in the industry for a lower melting self-fluxing machinable alloy capable of deposition on a wide variety of base metals with exceptionally good resistance to corrosion.

It is the general object of the present invention to avoid and overcome the foregoing and other difficulties and objections to prior art practices by the provision of a self-fluxing alloy capable of being deposited by welding that possesses exceptionally high resistance to corrosion.

Another object of the present invention is to provide a self-fluxing alloy with a lower melting temperature for a given hardness.

A further object of the present invention is to provide a self-fluxing alloy that is capable of being weld deposited on a broad range of base metals including those base metals that have lower melting temperatures.

Yet another object of the present invention has provided a self-fluxing alloy which on deposition by welding would provide a deposit with minimum base metal fusion and substantially no voids at the weld deposit bond line.

A still further object of this invention is to provide a self-fluxing alloy with good machinability characteristics.

A yet further object of the present invention is to provide a self-fluxing welding alloy with exceptionally good surface wetting characteristics and exceptionally good general welding characteristics.

In conducting a series of experiments with nickel boron silicon alloys, it was discovered that copper additions within specific ranges to these basic nickel boron silicon alloys resulted in alloys with greatly reduced melting temperatures. That is, it was found that the melting temperatures of the nickel boron silicon copper alloy systems of the present invention, as compared to the melting temperatures of nickel boron silicon alloys for the same hardness, were approximately 150° F. lower for the nickel boron silicon copper alloys.

Further experimentation with the nickel boron silicon copper alloys of this invention revealed that the boron content of the basic nickel boron silicon without copper alloys could be greatly reduced while still retaining the self-fluxing and surface wetting characteristics required of these alloys for utility in welding. The nickel boron silicon copper alloys of this invention have quite good surface wetting and welding characteristics with the boron content reduced to as low as 0.5%. As it will be understood by those skilled in the art, the boron in these boron containing alloys enhances their surface wetting characteristics and aids the deposition of these alloys on other base metals. However, the boron additions inherently interposes in these alloys some non-desirable properties such as a reduction of their resistance to corrosion and increased brittleness, and consequently it will be understood that it is extremely desirable to minimize the boron content of these alloys provided the desirable surface wetting properties are maintained.

Further experimentation with these alloys revealed that these alloys have extremely good machining characteristics and because of their generally lower relative melting temperatures, the alloys of these inventions have a broad depth of utility. As for example, nickel boron silicon copper alloys of this invention can be deposited on base metals such as the aluminum bronzes, the copper nickel alloys, the magnesium aluminum bronzes, all of which because of their lower melting properties are not suitable as base metals for the higher melting welding consumable alloys. In addition, the alloys of this invention have the ability and can very readily and quite easily be weld deposited on other higher melting base metals such as standard iron base alloys, cast iron, etc. Incidentally, because of their lower melting properties these alloys when deposited on cast iron, substantially eliminate base metal fusion which has been a big problem in industry.

After still further experimentation, it was found that the alloys of this invention have exceptional corrosion resistance characteristics as compared to other self-fluxing alloys. Various tests were performed with regard to testing the corrosion resistance of these alloys but the most significant one was the fact that these alloys have withstood highly concentrated flowing sulfuric acid in a warmed (200° F.) slurry state for a relatively long period of time. The nickel boron silicon copper alloys of this invention with the improved properties as hereinbefore described can be utilized for welding in any of the known welding product forms but it has been found that preferable results are obtained when the alloys are utilized as a cast rod and in a homogeneous alloy powder. The alloy powder can be manufactured by any of the well known manufacturing methods such as atomization.

The alloys of this invention comprises the following ranges of constituents in the present weights indicated.

Broad range

| Constituent: | Percent |
|---|---|
| Boron | .5–1.9 |
| Silicon | 1–4.5 |
| Copper | 23–35 |
| Nickel (essentially) | Balance |

Preferred range

| Constituent: | Percent |
|---|---|
| Boron | .9–1.5 |
| Silicon | 3–4.25 |
| Copper | 28–32 |
| Nickel (essentially) | Balance |

By way of example and without limiting the scope of this invention, the following are specific examples of alloys falling within the scope of the present invention in the constituents and percent by weight indicated.

EXAMPLE 1

| Constituent: | Percent |
|---|---|
| Boron | 1 |
| Silicon | 4 |
| Copper | 23 |
| Nickel (essentially) | Balance |

EXAMPLE 2

| Constituent: | Percent |
|---|---|
| Boron | 1 |
| Silicon | 4 |
| Copper | 27 |
| Nickel (essentially) | Balance |

EXAMPLE 3

| Constituent: | Percent |
|---|---|
| Boron | 1 |
| Silicon | 4 |
| Copper | 30 |
| Nickel (essentially) | Balance |

EXAMPLE 4

| Constituent: | Percent |
|---|---|
| Boron | 1 |
| Silicon | 1 |
| Copper | 28 |
| Nickel (essentially) | Balance |

EXAMPLE 5

| Constituent: | Percent |
|---|---|
| Boron | .5 |
| Silicon | 2 |
| Copper | 25 |
| Nickel (essentially) | Balance |

EXAMPLE 6

| Constituent: | Percent |
|---|---|
| Boron | 1 |
| Silicon | 2 |
| Copper | 30 |
| Nickel (essentially) | Balance |

After some further experimentation, it was found that a desirable class of alloys with the desirable properties outlined above and in addition having the property of being more sluggish when molten can be obtained by the addition of molybdenum up to 5 percent by weight with the preferred additions of molybdenum being limited to 3 to 5 percent by weight.

These alloys are particularly suitable for application where excessive fluidity in the molten pool leads to difficulty. For example, in metal spraying with subsequent refusion of the deposit, separation of the molten pool and incomplete coverage of the base metal are avoided and in the application of metal spraying with simultaneous molten pool generation on rounded or vertical parent metal substrates, molten metal runoff and deposit sagging is avoided thereby achieving a uniform coverage and thickness of deposit.

It will now be understood by those skilled in the art that the objects of the present invention have been achieved by providing a self-fluxing welding alloy having highly corrosion resistant properties and at the same time having lower melting properties permitting it to have application with a wide range of base metals. The weld deposits from this alloy are obtained easily because of the alloy's excellent weldability characteristics while at the same time providing sounder deposits and substantially eliminating voids at the boundary line.

What is claimed is:

1. A nickel base alloy consisting essentially of the following constituents in the indicated range percentages by weight:

| Constituent: | Range |
|---|---|
| Boron | .5–1.9 |
| Silicon | 1–4.5 |
| Copper | 23–35 |
| Nickel | Balance |

2. A nickel base alloy as set forth in claim 1 wherein said ranges of percentages by weight are:

| Constituent: | Range |
|---|---|
| Boron | .9–1.5 |
| Silicon | 3–4.25 |
| Copper | 28–32 |
| Nickel | Balance |

3. The nickel base alloy of claim 2 wherein the alloy is in rod form.

4. The nickel base alloy of claim 2 wherein the alloy is in powder form.

5. The nickel base alloy of claim 2 comprising up to 5% by weight of molybdenum.

6. The nickel base alloy of claim 5 comprising from about 3 to about 5% by weight of molybdenum.

7. The nickel base alloy of claim 6 wherein the alloy is in rod form.

8. The nickel base alloy of claim 6 wherein the alloy is in powder form.

9. The nickel base alloy of claim 2 consisting essentially of the following constituents in percent by weight:

| Boron | 1 |
|---|---|
| Silicon | 4 |
| Copper | 27 |
| Nickel | Balance |

10. The nickel base alloy of claim 2 consisting essentially of the following constituents in percent by weight:

| Boron | 1 |
|---|---|
| Silicon | 4 |
| Copper | 30 |
| Nickel | Balance |

References Cited

UNITED STATES PATENTS

| 2,936,229 | 5/1960 | Shepard | 75—170 |
|---|---|---|---|
| 3,293,029 | 12/1966 | Broderick et al. | 29—191.6 |

RICHARD O. DEAN, *Primary Examiner.*

U.S. Cl. X.R.

75—159